(12) United States Patent
Cunningham et al.

(10) Patent No.: US 6,470,587 B1
(45) Date of Patent: Oct. 29, 2002

(54) METHOD AND SYSTEM FOR PART MEASUREMENT AND VERIFICATION

(75) Inventors: Clifton Dale Cunningham, Grapevine; James McKinnon Fitch, Hurst; James Jeffery Howard, Mansfield; James Paul Koesters; Michael Alan Leenhouts, both of Grapevine; Eric Dewayne Moore, Grand Prairie, all of TX (US)

(73) Assignee: Vought Aircraft Industries, Inc., Dallas, TX (US)

( * ) Notice: Subject to any disclaimer, the term of this patent is extended or adjusted under 35 U.S.C. 154(b) by 0 days.

(21) Appl. No.: 09/351,032

(22) Filed: Jul. 9, 1999

(51) Int. Cl.$^7$ ................................. G01B 3/28
(52) U.S. Cl. ......................................... 33/557; 33/549
(58) Field of Search .................... 33/549, 551, 552, 33/554, 555, 573, 556, 557, 558, 832, 833, 572

(56) References Cited

U.S. PATENT DOCUMENTS

| | | |
|---|---|---|
| 3,633,011 A | 1/1972 | Bederman et al. |
| 3,944,798 A | 3/1976 | Eaton |
| 4,120,095 A | 10/1978 | Lebourg |
| 4,296,474 A | 10/1981 | Hurt |
| 4,333,238 A | 6/1982 | McMurtry |
| 4,400,884 A | 8/1983 | Baresh et al. |
| 4,437,151 A | 3/1984 | Hurt et al. |
| 4,677,755 A | 7/1987 | Iwano et al. |
| 4,754,417 A | 6/1988 | Beeson et al. |
| 4,831,741 A * | 5/1989 | Sogoian ...................... 33/502 |
| 4,866,643 A | 9/1989 | Dutler |
| 4,888,877 A | 12/1989 | Enderle et al. |
| 4,891,889 A | 1/1990 | Tomelleri |
| 4,901,253 A | 2/1990 | Iwano et al. |
| 4,942,545 A | 7/1990 | Sapia |
| 4,945,501 A | 7/1990 | Bell et al. |
| 4,953,306 A | 9/1990 | Weckenmann et al. |

(List continued on next page.)

FOREIGN PATENT DOCUMENTS

| | | |
|---|---|---|
| FR | 2703447 | 4/1993 |
| GB | 2075185 | 4/1981 |

OTHER PUBLICATIONS

International Search Report for European Patent Application No. 00305592.8, Oct. 2, 2000.

*Primary Examiner*—Christopher W Fulton
(74) *Attorney, Agent, or Firm*—Baker Botts L.L.P.

(57) ABSTRACT

A system for part measurement and verification is disclosed. The system comprises a set of design criteria specifying a part and a fixture with gage blocks for positioning the part, where each of the gage blocks represents a known position. At least one probe is operable to measure the scalar values of the part and the gage blocks. A handheld information processor or computer is coupled to the probe for receiving the measurements and is operable to transform the measurements and compare those measurements to the design criteria to in order to verify the part.

A method for part measurement and verification is disclosed. The method comprises eight steps. Step one calls for specifying the part with a set of design criteria. Step two requires storing the design criteria in a handheld information processor. Step three provides placing the part in a fixture with gage blocks at known locations. In step four, the method provides for configuring the handheld information processor to receive part measurements. The next step calls for measuring the part with a handheld probe to generate part measurements. Step six calls for receiving the generated part measurements in the handheld information processor. Step seven requires transforming the generated part measurements to a different reference frame. The last step calls for comparing the transformed part measurements to the design criteria in order to generate a part verification report.

25 Claims, 10 Drawing Sheets

U.S. PATENT DOCUMENTS

| | | |
|---|---|---|
| 5,016,199 A | 5/1991 | McMurtry et al. |
| 5,187,874 A | 2/1993 | Takahashi et al. |
| 5,193,286 A * | 3/1993 | Collier .................. 33/1 M |
| 5,276,974 A | 1/1994 | Chanoni et al. |
| 5,285,397 A | 2/1994 | Heier et al. |
| 5,347,471 A | 9/1994 | Simon et al. |
| 5,412,880 A | 5/1995 | Raab |
| 5,414,939 A | 5/1995 | Waugaman |
| 5,425,180 A | 6/1995 | Breyer |
| 5,471,406 A | 11/1995 | Breyer et al. |
| 5,491,638 A | 2/1996 | Georgi et al. |
| 5,510,977 A | 4/1996 | Raab |
| 5,515,613 A | 5/1996 | Hinson |
| 5,715,167 A | 2/1998 | Gupta et al. |
| 5,724,745 A | 3/1998 | Brenner et al. |
| 5,726,917 A | 3/1998 | Staaden |
| 5,737,244 A | 4/1998 | Ruck |
| 5,781,450 A | 7/1998 | Glasson |
| 5,829,151 A * | 11/1998 | Collier et al. .............. 33/1 M |
| 5,839,202 A | 11/1998 | Tezuka et al. |
| 5,883,313 A * | 3/1999 | Ercole et al. .............. 33/504 |
| 5,910,894 A | 6/1999 | Pryor |

\* cited by examiner

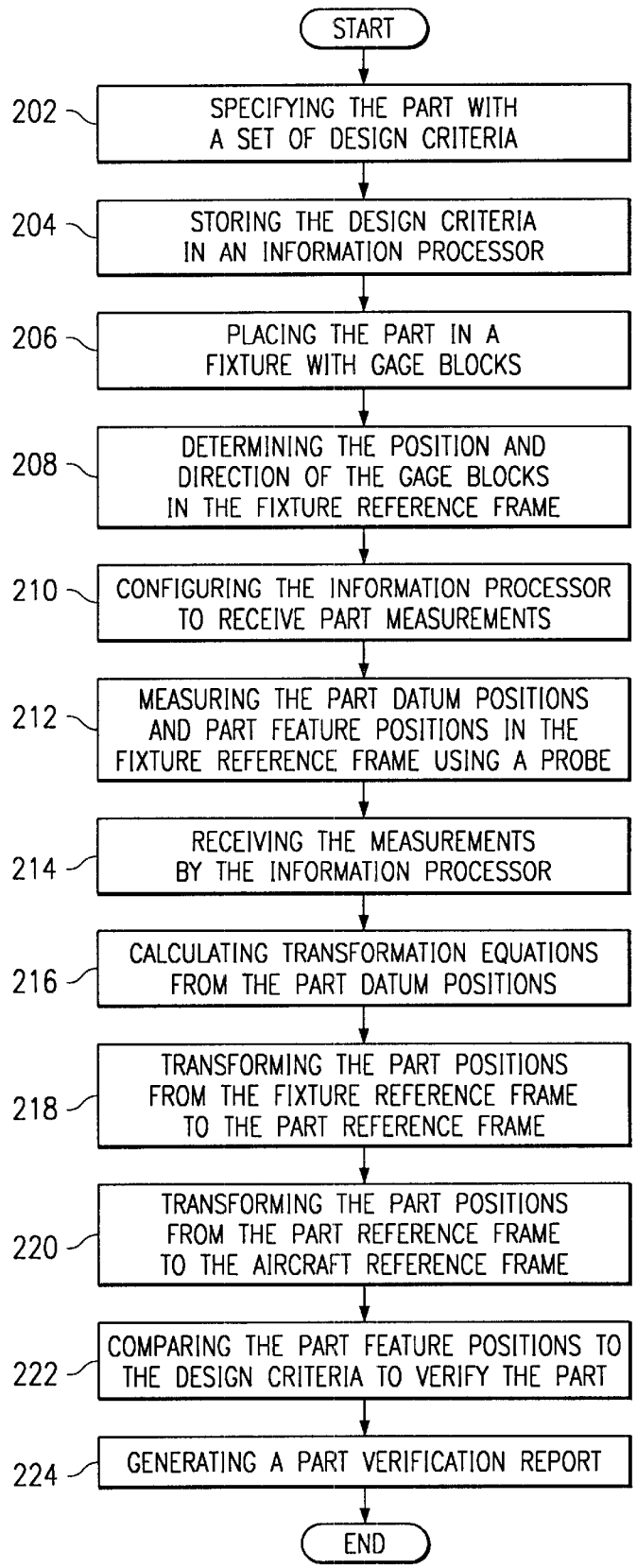

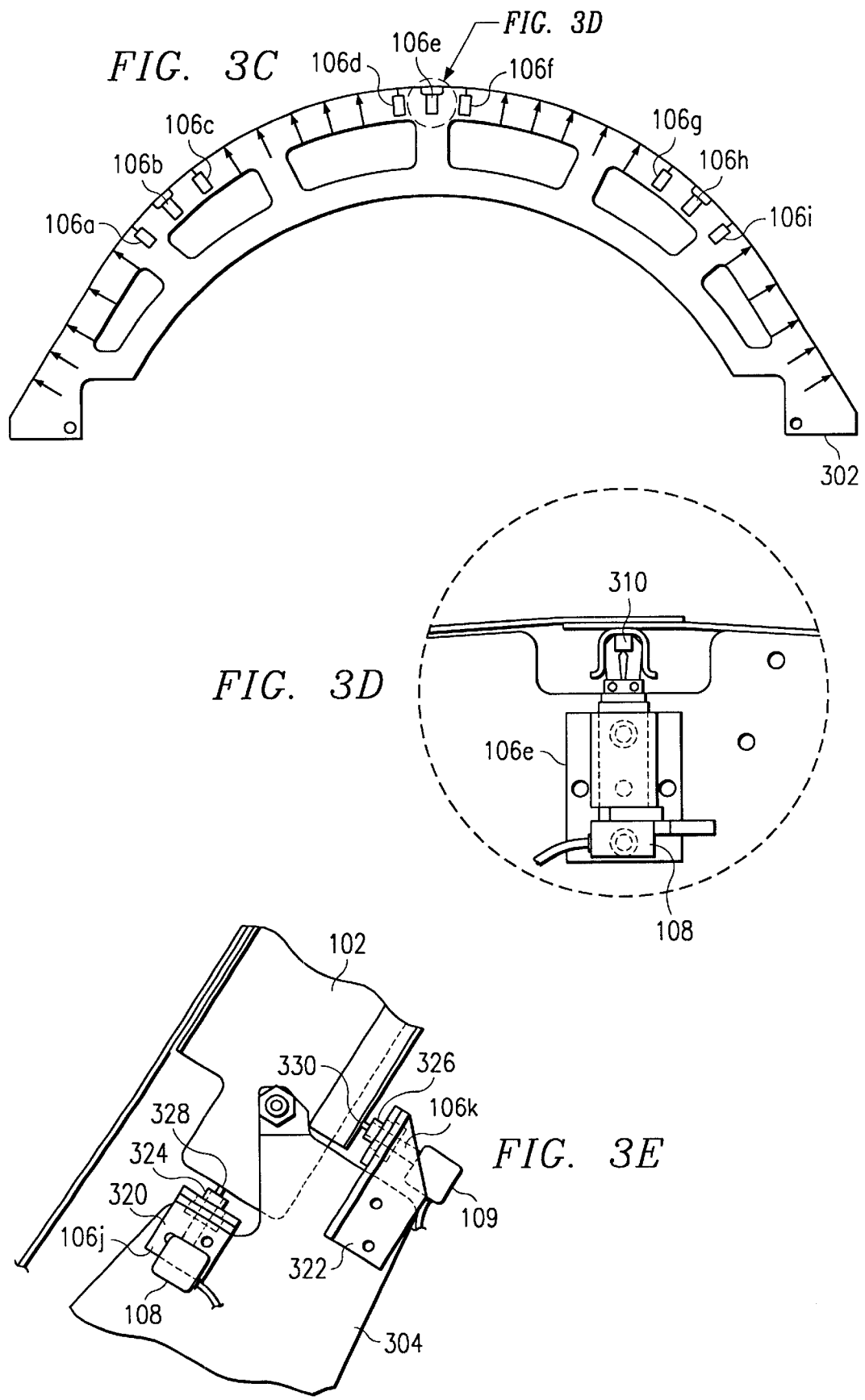

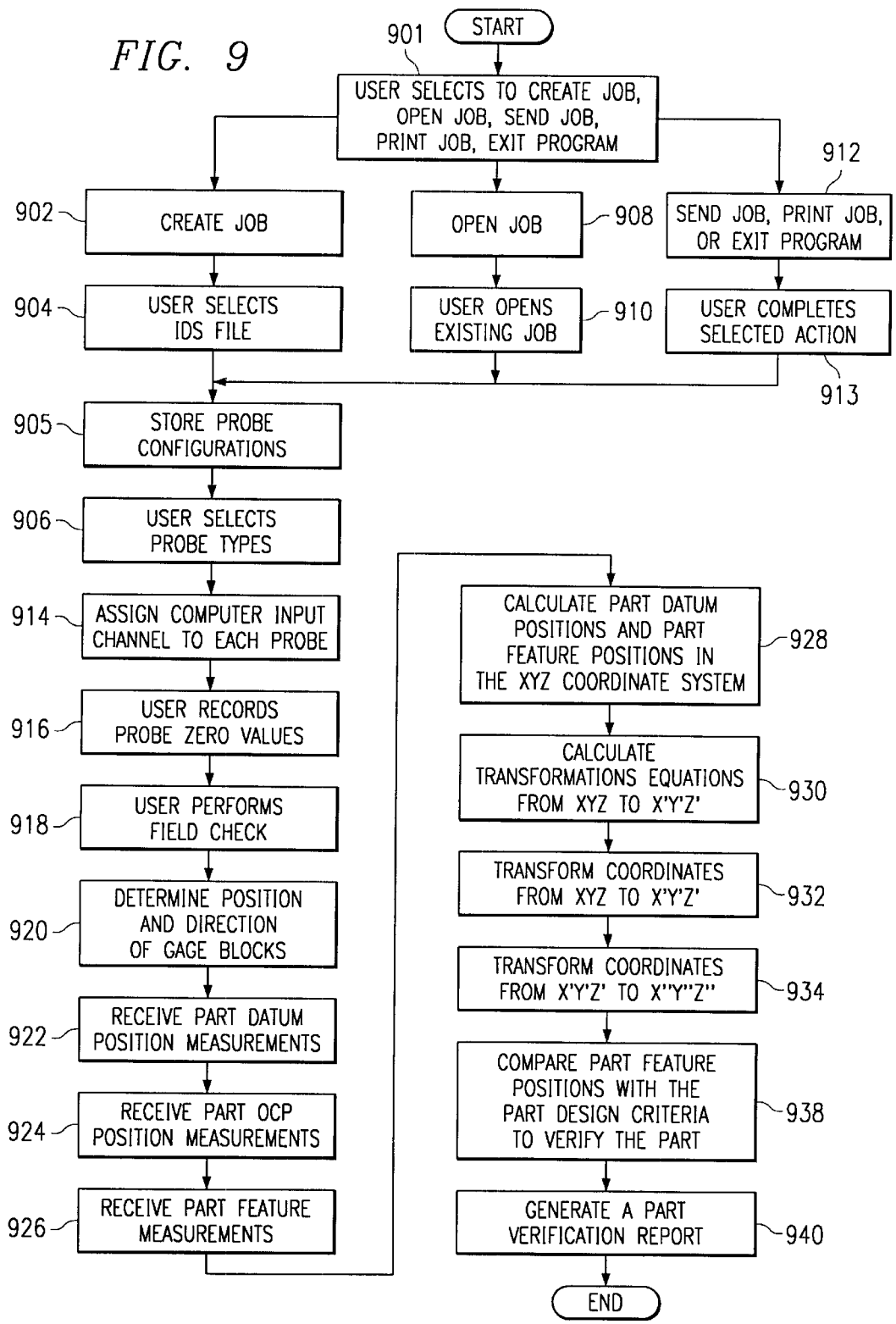

METHOD AND SYSTEM FOR PART MEASUREMENT AND VERIFICATION

TECHNICAL FIELD OF THE INVENTION

This invention relates generally to the field of quality assurance and, more specifically, to a method and system for part measurement and verification.

BACKGROUND OF THE INVENTION

Parts manufacturers must inspect individual parts to ensure that they meet the appropriate design criteria. Moreover, the growing complexity of modem manufacturing technology places increasingly higher demands on industrial measurement and verification systems. Known methods of measurement and verification, however, have not been completely satisfactory with respect to accuracy, speed, and ease of use.

Known methods of inspecting manufactured parts include using single dimension measurement systems, coordinate measurement machines, and laser tracking systems. Known single dimension measurement systems involve two separate stages: data acquisition and data analysis. In the data acquisition stage, a measurement probe is placed in a gage block to measure a part feature. The result of the data acquisition stage is a list of features and their measurements. In the data analysis stage, the measurement data is taken to a separate computer where it is analyzed. The computer must first transform the measured data to a format and reference frame compatible with the data describing the design criteria. Next, a comparison of the measurement of each feature with the design criteria is made to verify that the feature meets the design criteria. One of the problems associated with this approach is that it requires two or more separate systems, at least one for data acquisition and another one for data analysis. A third system may be required to perform the data transformation. Another problem is that there is a time delay between when the data is acquired to when it is analyzed to verify the part. A third problem is that the known single measurement systems are not sufficiently accurate for applications requiring very high degrees of precision, such as is called for in the manufacture of aircraft. When analyzing the data, the measurement is assumed to have been taken from a particular location marked by the gage block. If the gage block is not at that location or has been moved, the measurement will not be accurate.

Coordinate measurement machines (CMMs) measure manufactured parts using contact probes. Typical CMMs comprise one or more probes that are coupled to a horizontal surface on which the part to be measured is placed. CMMs often use control panels to move the probe across the part and computer terminals to provide the measurement results. One problem with using CMMs is that the part to be inspected must be carried to the CMM itself. Large or bulky parts may be difficult to carry to the CMM, and carrying parts from different parts of the manufacturing facility to the CMM may be time consuming and inefficient.

A laser tracker is a portable device that uses lasers to take measurements of a manufactured part. Laser trackers offer an advantage over CMMs in that they can be taken to the part to be measured. In addition, laser trackers can be used to measure parts that are too large to be placed on a CMM. A problem with a laser tracker, however, is that it requires a direct line of sight in order to be able to measure a part. Many parts may be placed in fixtures, causing an area of a part to be hidden such that there is no direct line of sight that the laser tracker can use to measure the area. Moreover, with some oddly shaped parts, the laser tracker may need to be maneuvered in an inconvenient manner in order to take measurements.

While these devices and methods have provided a significant improvement over prior approaches, the challenges in the field of quality assurance have continued to increase, with demands for more and better techniques having greater flexibility and adaptability. Therefore, a need has arisen for a new method and system for part measurement and verification.

SUMMARY OF THE INVENTION

In accordance with the present invention, a method and system for part measurement and verification are provided that substantially eliminate or reduce the disadvantages and problems associated with previously developed systems and methods.

A system for part measurement and verification is disclosed. The system comprises a set of design criteria specifying a part and a fixture with gage blocks for positioning the part, where each of the gage blocks represents a known position. At least one probe is operable to measure the scalar values of the part and the gage blocks. A handheld information processor or computer is coupled to the probe for receiving the measurements and is operable to transform the measurements and compare those measurements to the design criteria in order to verify the part.

A method for part measurement and verification is disclosed. The method comprises eight steps. Step one calls for specifying the part with a set of design criteria. Step two requires storing the design criteria in a handheld information processor. Step three provides placing the part in a fixture with gage blocks at known locations. In step four, the method provides for configuring the handheld information processor to receive part measurements. The next step calls for measuring the part with a handheld probe to generate part measurements. Step six calls for receiving the generated part measurements in the handheld information processor. Step seven requires transforming the generated part measurements to a different reference frame. The last step calls for comparing the transformed part measurements to the design criteria in order to generate a part verification report.

In another method for part measurement verification, there are six steps. The first step calls for storing a digital representation of a part in a memory. The second step calls for configuring the logic unit to read data from the probe representative of part measurement. Step three requires receiving the probe data. Step four provides for generating part measurements from the probe. Step five calls for transforming the part measurement from the first reference frame to a second reference frame. The final step calls for comparing the transformed part measurement to the digital representation to verify the part.

Another system for part measurement and verification is disclosed. The system comprises a belt operable to be worn by a user. There are one or more pouches fixed to the belt and adapted to receive a probe. A wiring harness contained within the belt has couplers to connect the probe to an information processor.

A technical advantage of the present invention is that a system and method for part measurement and verification is provided that is capable of real time data measurement, acquisition, analysis, verification and reporting of inspection results. Another technical advantage of the present invention is that it is a self-contained, highly portable tool-based inspection system. Another technical advantage is that the present invention provides more flexible and adaptable part measurement and verification. Another technical advantage of the present invention is that it can be performed in software on a single information processor. Another technical advantage is that the present invention provides a single system that is entirely contained on a belt to be worn by an individual user.

BRIEF DESCRIPTION OF THE DRAWINGS

For a more complete understanding of the present invention, and for further features and advantages, reference is now made to the following description, taken in conjunction with the accompanying drawings, in which:

FIG. 2 is a flowchart demonstrating one method of measurement and verification in accordance with the present invention;

FIG. 3C is the view 3C—3C of FIG. 3B, illustrating, in greater detail, a gage block coupled to a fixture;

FIG. 3D illustrates, in greater detail, the gage block of FIG. 3C;

FIG. 3E is the view 3E—3E of FIG. 3B, illustrating, in greater detail, a gage block and a part;

FIG. 9 is a flowchart demonstrating, in greater detail, one method of measurement analysis in accordance with the present invention.

DETAILED DESCRIPTION OF THE DRAWINGS

Figure 1:
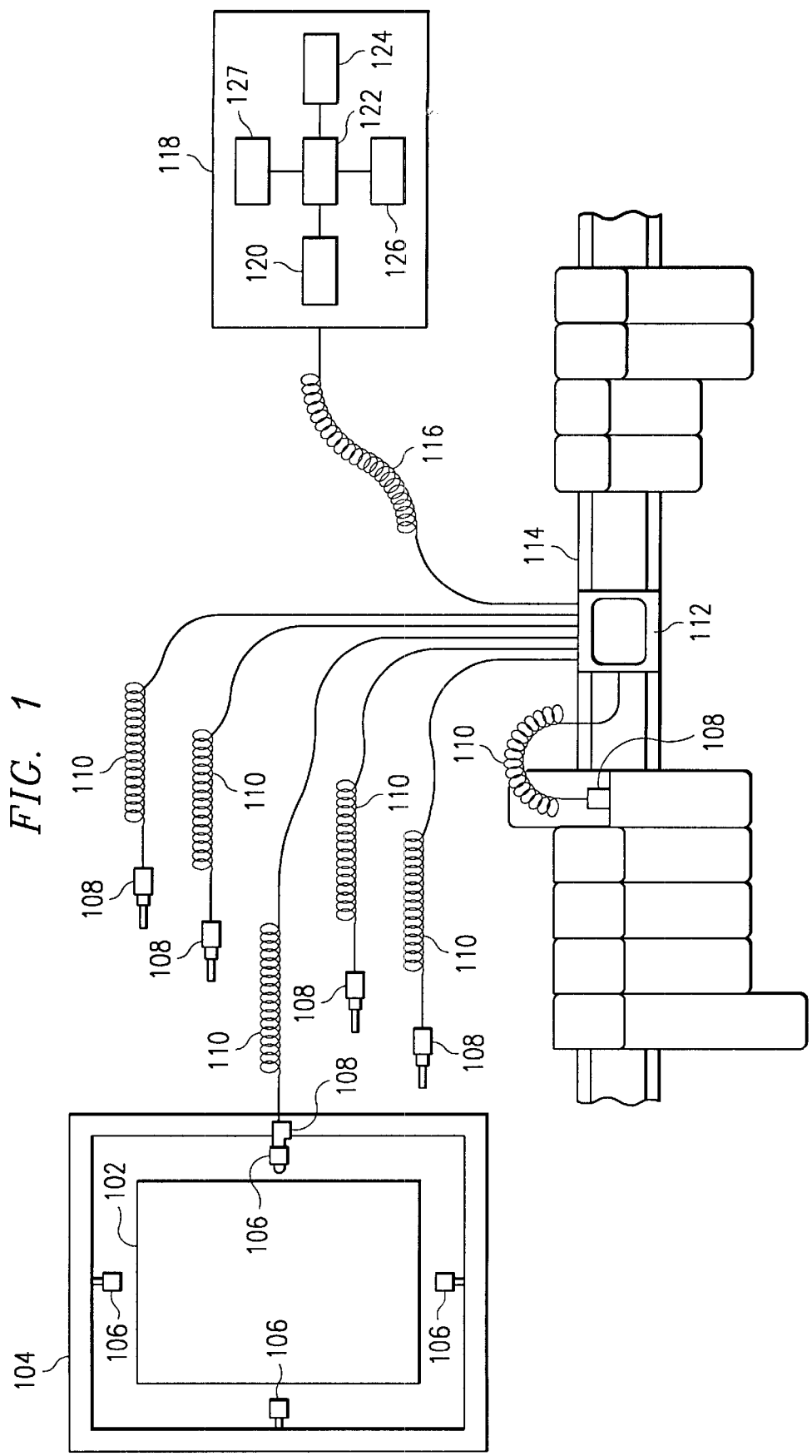
FIG. 1 is a system block diagram of one embodiment of the present invention.

FIG. 1 is a system block diagram of one embodiment of the present invention. In this embodiment, a part 102 to be measured and verified is placed on a fixture 104. The part 102 may be anything, for example, the upper bonnet of an airplane fuselage or the side panel of an automobile. The fixture 104 may be, for example, a fixed assembly jig. The fixture 104 includes one or more gage blocks 106. A gage block 106 is designed to hold and position a probe 108 used to measure the part 102. The gage blocks 106 are described in more detail in connection with FIGS. 3C, 3D and 3E. The probes 108 are described in more detail in connection with FIGS. 4, 5A, and 5B. In this particular embodiment, up to six probes 108 may be used to measure the part 102. Each probe 108 performs a scalar measurement and generates an electrical signal representation of that measurement. The probes 108 are coupled by cables 110 to a field wiring assembly 112, which is described in further detail in connection with FIG. 7. A belt 114, which is described in more detail in connection with FIGS. 6A, 6B, 6C, and 6D, holds the probes 108 and the field wiring assembly 112. A cable 116 couples the field wiring assembly 112 to an information processor 118. The information processor 118 can be an off-the-shelf personal computer adapted for use in the present invention. It may be a handheld computer, for example, a Telxon PTC 1194 computer with a National Instruments DAQ 500 analog-to-digital card. The information processor 118 comprises an analog digital card 120, a processor 122, a memory 124, at least one input device 126, and a display 127. The analog-to-digital card 120 converts the analog measurements received from the probes 108 to digital data. The processor 122 processes data, the memory 124 stores data, and the input device 126 is used by the user to interact with the information processor 118. Display 127 provides visual information to the user. FIG. 2 is a flowchart demonstrating one method of measurement and verification in accordance with the present invention. The method begins with step 202, where the part 102 to be measured and verified is specified with a set of design criteria. The design criteria may be, for example, the specifications for the part, and may be part of an inspection data set (IDS), which may be, for example, a protected Microsoft™ Excel disk file. The design criteria may originally have been created using computer aided design software such as CATIA. The design criteria may be expressed in the part reference system, which, by way of example, may be a part for an aircraft. The design criteria may also be specified in a third reference frame, which in this example, would be the aircraft reference frame. The design criteria are stored in an information processor 118, as stated in step 204. In step 206, the part 102 is placed in a fixture 104. The fixture includes gage blocks 106, which are used to position the probes 108 that measure the part. In step 208, the position and direction of each gage block 106 is determined. The position and direction data may be expressed with respect to, for example, the fixture reference frame, and may be part of the IDS file.

The method then proceeds to step 210, where the information processor 118 is configured to receive part measurements. In step 212, the positions of the part datum and part features are measured using the probe 108. Part datums are used to align the part, and part features are used to compare the part to the design criteria. The information processor 118 receives these measurements, as stated in step 214.

The method then proceeds to step 216, where transformation equations are calculated from the part datum positions. The transformation aligns the part datums with their associated nominal positions by transforming the coordinates from the fixture reference frame to the part reference frame. For example, if a particular part datum is supposed to have the coordinate (0,0,0), the transformation will assign that coordinate to the datum. This transformation is applied to eliminate deviations between the part datums and their associated nominal positions that may have occurred while placing the part on the fixture. If the design criteria are expressed in the part reference frame, the measurements may be compared with the criteria once they have been transformed to this reference frame. In this particular embodiment of the invention, the design criteria are expressed in the aircraft reference frame, so another transformation is applied to transform the measurement data from the part reference frame to the aircraft reference frame. After the transformation equations are calculated, the method proceeds to step 218, where the positions are transformed from the fixture reference frame to the part reference frame using the transformation equations calculated in step 216. In step 220, the positions are transformed from the part reference frame to the aircraft reference frame, in order to express the measurements in the reference frame of the design criteria. The transformation equations for this transformation are fixed, and may be included, for example, in the IDS file.

After the measured positions have been transformed to the same reference frame as that of the design criteria, the method proceeds to step 222, where the measured positions are compared to the design criteria in an order to verify the part 102. The information processor 118 verifies whether the measured positions fall within the acceptable range as specified by the design criteria. Finally, the method proceeds to step 224, where the information processor 118 generates a part verification report. The part verification report may state, for example, the measurements of the part features and whether the measurements fall within the acceptable range of the design criteria.

Figure 3A:
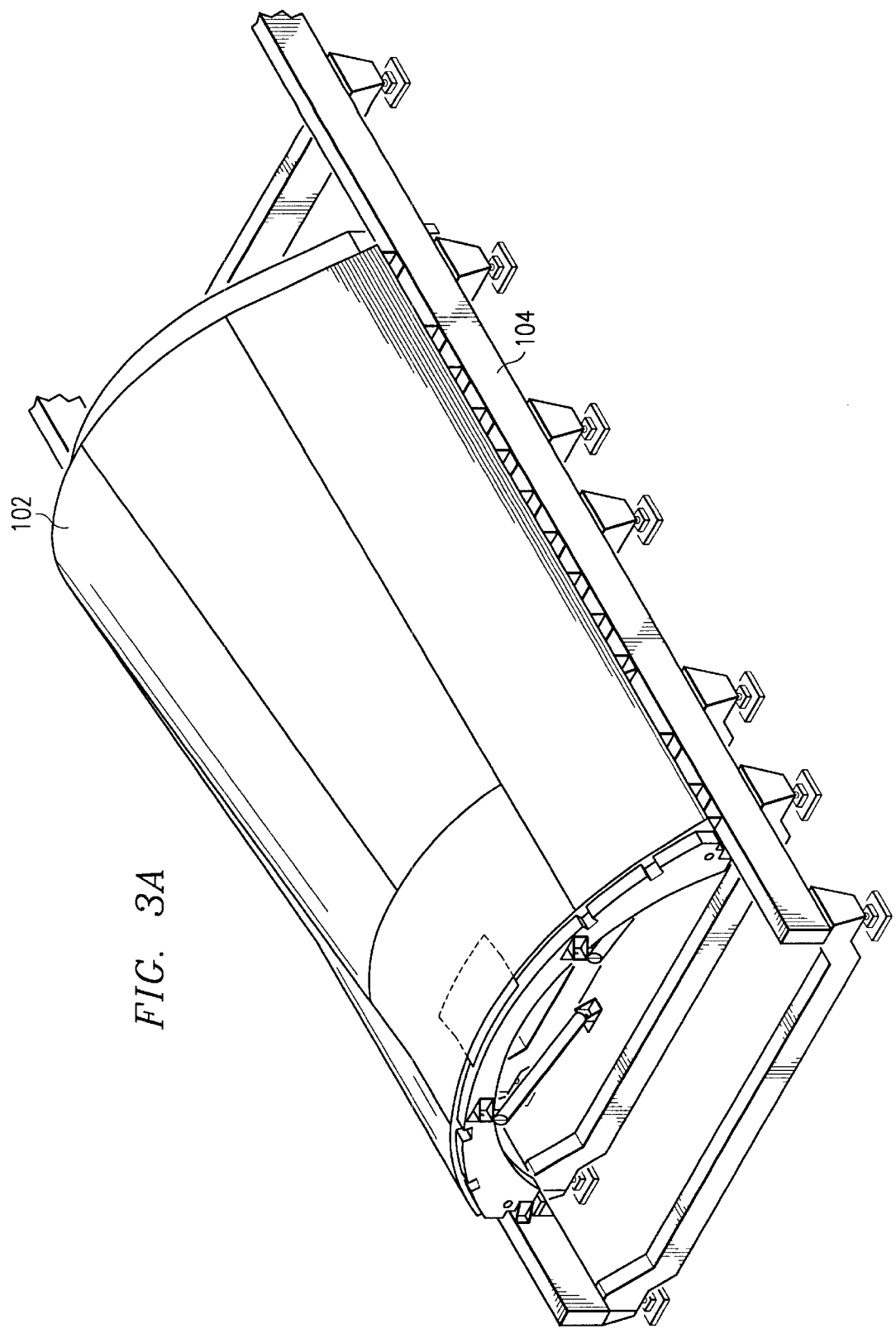
FIG. 3A illustrates a perspective view of one embodiment of a part coupled to a fixture.
Figure 3B:
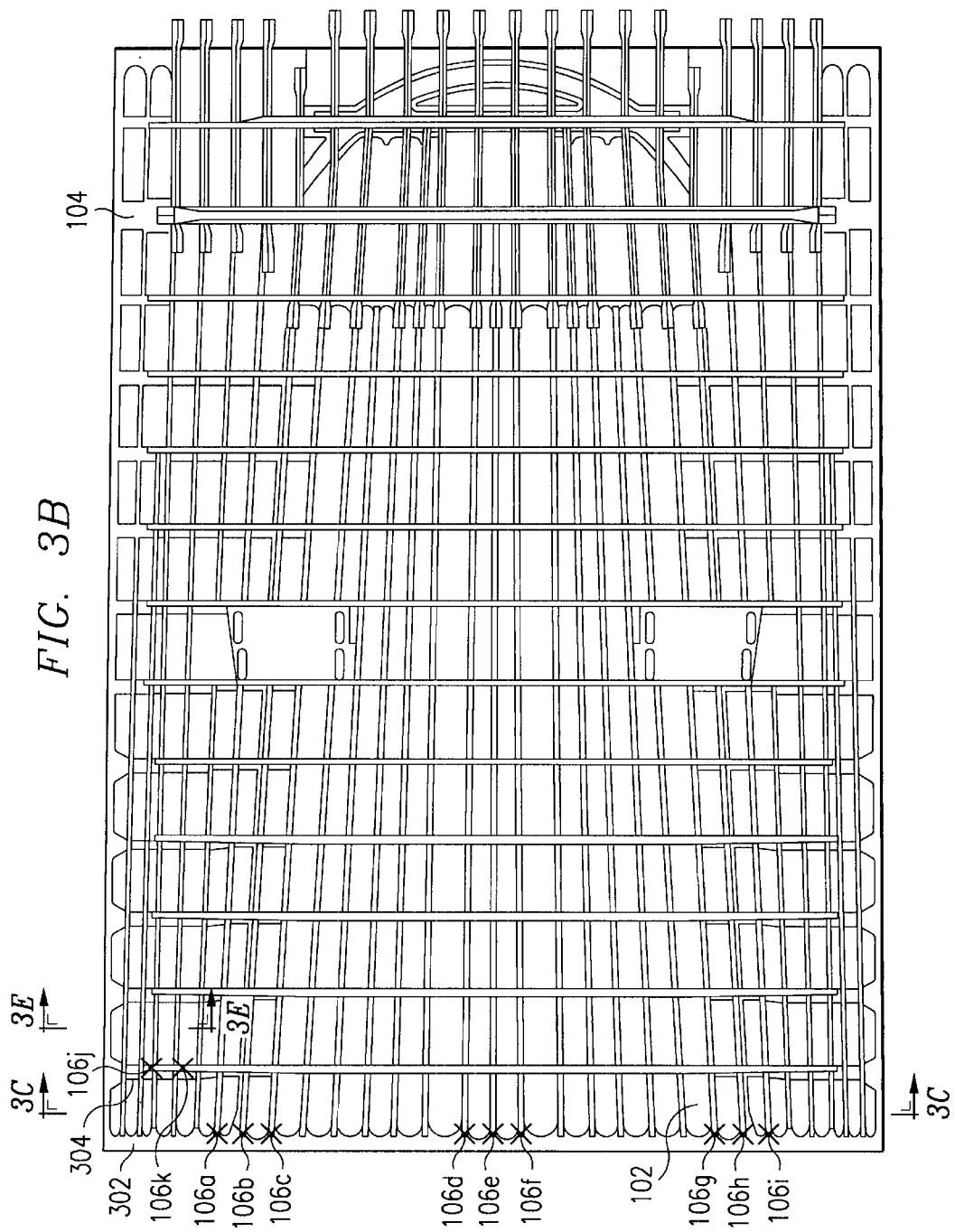
FIG. 3B illustrates an underside view the part and fixture of FIG. 3A.

FIG. 3A illustrates a perspective view of one embodiment of a part 102 coupled to a fixture 104. In this example, the part 102 is the upper bonnet of an airplane fuselage. The fixture 104 is a floor assembly jig. FIG. 3B illustrates an underside view of the part 102 and fixture 104 of FIG. 3A. The figure shows three groups of three gage blocks 106a–106i coupled to a fixture rib 302 near the forward edge of the part and two gage blocks 106j and 106k coupled to a fixture rib 304 near the forward corner of the panel. The gage blocks 106a–106k position the probes that are used to measure the part 102. FIG. 3C is a view along the line 3C—3C of FIG. 3B illustrating, in greater detail, gage blocks 106a–106i and a fixture rib 302. Three groups of three gage blocks 106a–106i are coupled to the fixture rib 302. FIG. 3D presents an enlarged view of a probe 108 coupled to the gage block 106e of FIG. 3C. The probe 108 may be, for example, a TP107-EP100 probe, manufactured by MP Components. The TP107-EP100 probe is a single axis device used to locate and measure the stringer centerline 310. The measurements collected from this probe represent the linear deviation of the stringer centerline from a known reference point.

FIG. 3E is the view along the line 3E—3E of FIG. 3B illustrating, in greater detail, gage blocks 106j and 106k and a part 102. The probes 108 and 109 are coupled to gage blocks 106j and 106k, respectively, coupled to fixture rib 304. The probes 108 and 109 may be, for example, 200-SB probes, manufactured by Linear Measurements Instruments (LMI). The 200-SB probe is a single axis device used to measure linear displacement and has a range of approximately 10 mm. The probe is positioned to measure a feature location using a gage block, coupled to a bracket and a bushing. The probes 108 and 109 are coupled to brackets 320 and 322, respectively, and bushings 324 and 326, respectively. The brackets may be, for example, LMI 264 brackets. The index bushings may be, for example, LMI 1261 index bushings, which are standard ⅜ inch diameter threaded bushings. One probe 108 measures the edge of part 328, and the other probe 109 measures the molding line 330 of the part.

Figure 4:
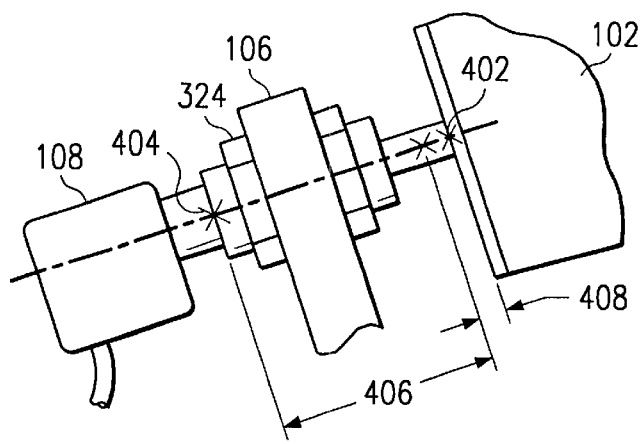
FIG. 4 illustrates one embodiment of a one-dimensional probe and a gage block.

FIG. 4 illustrates one embodiment of a one-dimensional probe 108 and a gage block 106. The probe 108, which is coupled to an index bushing 324 of a gage block 106, measures a part feature 402 of a part 102. The gage block position ($x_g$, $y_g$, $z_g$) and direction (i, j, k) 404 are expressed in the fixture reference frame. The nominal setback 406 is the distance from the gage block ($x_g$, $y_g$, $z_g$) 404 to the tip of the probe. The probe measures the scalar distance 408 from the probe tip to the part feature 402. Examples of one-dimensional scalar measurement probes include the TP107-EP100 probe, manufactured by MP Components, and the 200-SB probe, manufactured by LMI.

Figure 5A:
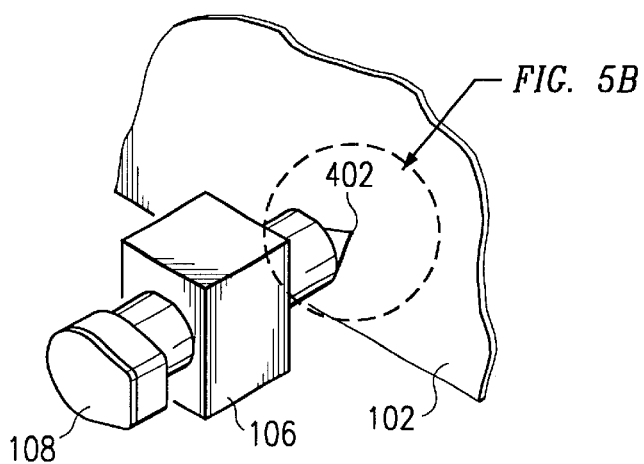
FIG. 5A illustrates one embodiment of a two-dimensional probe and a gage block.
Figure 5B:
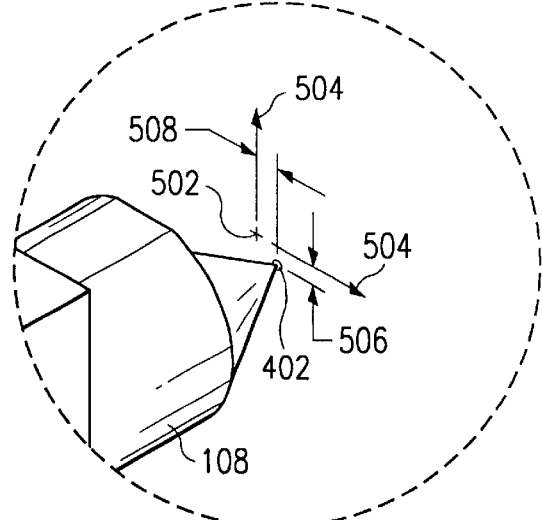
FIG. 5B illustrates, in greater detail, the two-dimensional probe of FIG. 5A.

FIGURE 5A illustrates one embodiment of a two-dimensional probe 108 and a gage block 106. The probe 108, which is located in a gage block 106, measures the part feature 402 of a part 102. FIGURE 5B illustrates, in greater detail, the two-dimensional probe 108 of FIG. 5A measuring a part feature 402. The gage block position 502 and direction 504 are expressed in the fixture frame of reference. The probe measures the vertical 506 and horizontal 508 displacement of the part feature 402. Examples of two-dimensional scalar measurement probes include the TP107 and the TP108 probes, both manufactured by MP components, which are used to locate the center line of panel reference holes and to measure the two-dimensional deviation of the part reference hole from a known reference point.

Figure 6A:
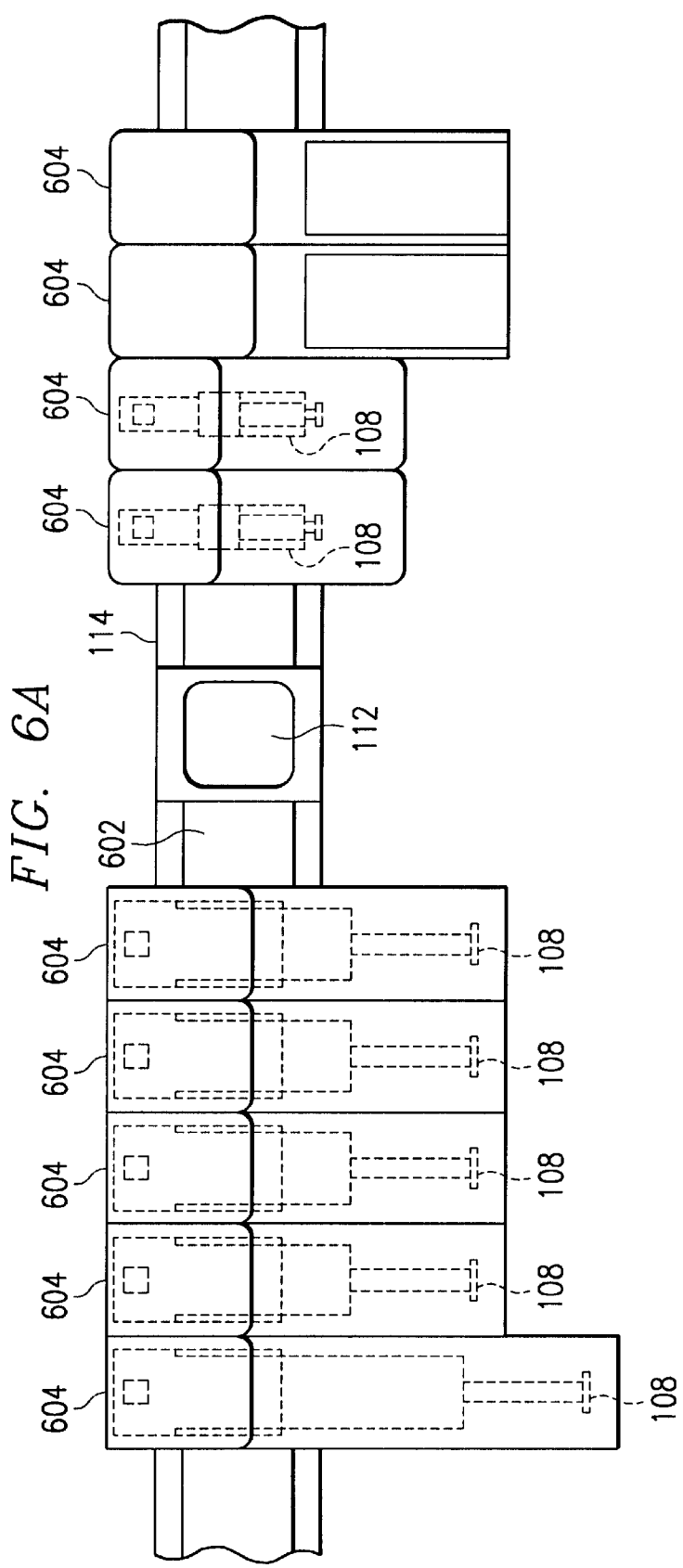
FIG. 6A illustrates one embodiment of a belt in accordance with one embodiment of the present invention.
Figure 6B:
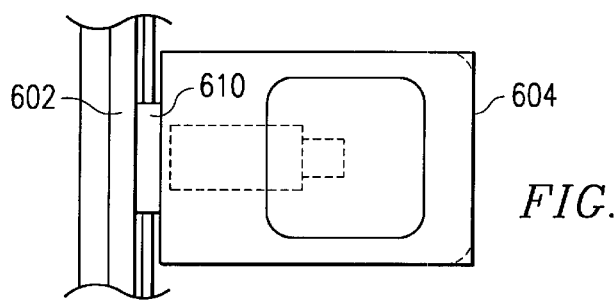
FIG. 6B illustrates, in greater detail, a top view of a pouch of the belt of FIG. 6A.
Figure 6C:
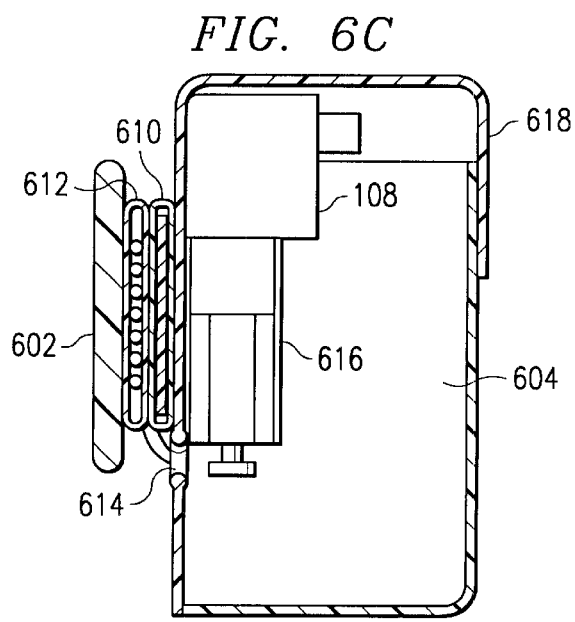
FIG. 6C illustrates, in greater detail, a side view of a pouch of the belt of FIG. 6A.
Figure 6D:
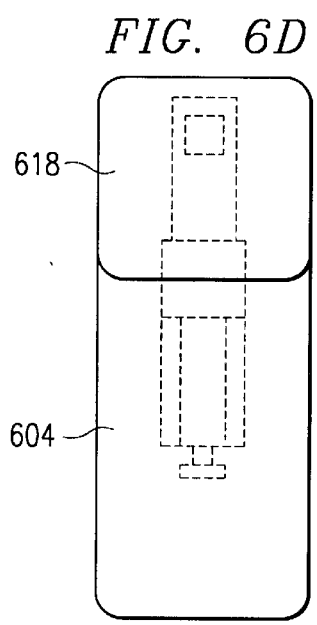
FIG. 6D illustrates, in greater detail, a front view of a pouch of the belt of FIG. 6A.
Figure 7:
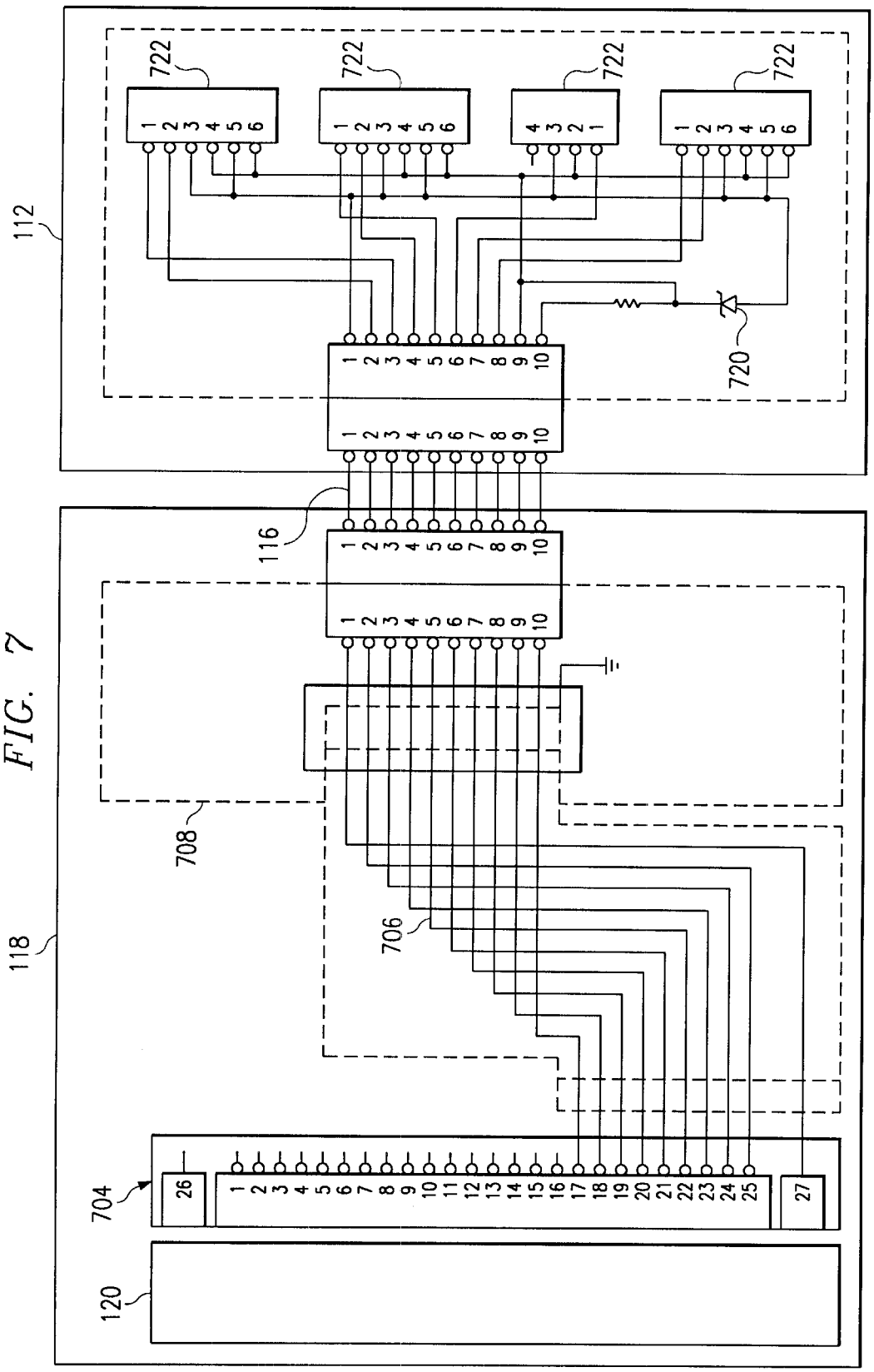
FIG. 7 is a wiring diagram for one embodiment of an information processor and a field wiring assembly.

FIG. 6A illustrates one embodiment of a belt 114 in accordance with one embodiment of the present invention. Nine pouches 604 are coupled to a waistband 602, which may be designed to fit around a user's waist and is operable to be worn by the user. Note that the pouches are of different shapes to hold different types of probes 108. Waistband 602 and pouches 604 may be constructed of fabric, leather or any appropriate web material. A field wiring assembly 112, which is discussed in more detail in connection with FIG. 7, is coupled to the waistband 602. FIG. 6B illustrates, in greater detail, a top view of a pouch 604 of the belt of FIG. 6A. The pouch 604 is coupled to the waistband 602 by a pouch loop 610. FIG. 6C illustrates, in greater detail, a side view of a pouch 604 of the belt of FIG. 6A. In this cutaway illustration, a probe 108 is shown inside the pouch 604. The pouch 604 is coupled to the waistband 602 by a pouch loop 610. The belt includes a Velcro wire conduit 612, which provides wiring for the probe 108. A feed-through hole 614 provides a path through which wiring from the Velcro wiring conduit 612 is coupled to the probe 108. A probe loop 616 is used for holding the probe 108 securely in the pouch 604. The pouch 604 may include a flap 618 for securing a probe 108 in the pouch 604. FIG. 6D illustrates, in greater detail, a front view of a pouch 604 of the belt of FIG. 6A. The flap 618 is shown closing the pouch 604.

FIG. 7 is a wiring diagram for one embodiment of an information processor 118 and a field wiring assembly 112, or wiring harness. The information processor 118 is coupled to the field wiring assembly 112 with a cable 116. The information processor 118 may be, for example, a Telxon PTC 1194 hand-held computer, and includes an analog-to-digital card 120, a connector 704, a cable 706, and a transition board 708. The analog-to-digital card 120 may be, for example, a National Instruments DAQ 500 card. The connector 704 may be a commercially-available connector for the DAQ 500. The cable 706 may be, for example, a National Instruments PR27-30F cable. The transition board 708 converts a signal from the DAQ 500 to RJ48. The cable 116 coupling the information processor 118 to the field wiring assembly 112 may be a 10-conductor, silver satin telcom cable. The field wiring assembly 112 provides excitation to the probes and receives signals from the probes. The field wiring assembly 112 may be coupled to the belt 114 of FIG. 1, and includes a diode 720 and probe connectors 722. The diode 720 conditions the signal. The probe connectors 722, which may be RJ10 or RJ12 connectors, couple the probes 108 of FIG. 1 to the field wiring assembly 112.

Figure 8:
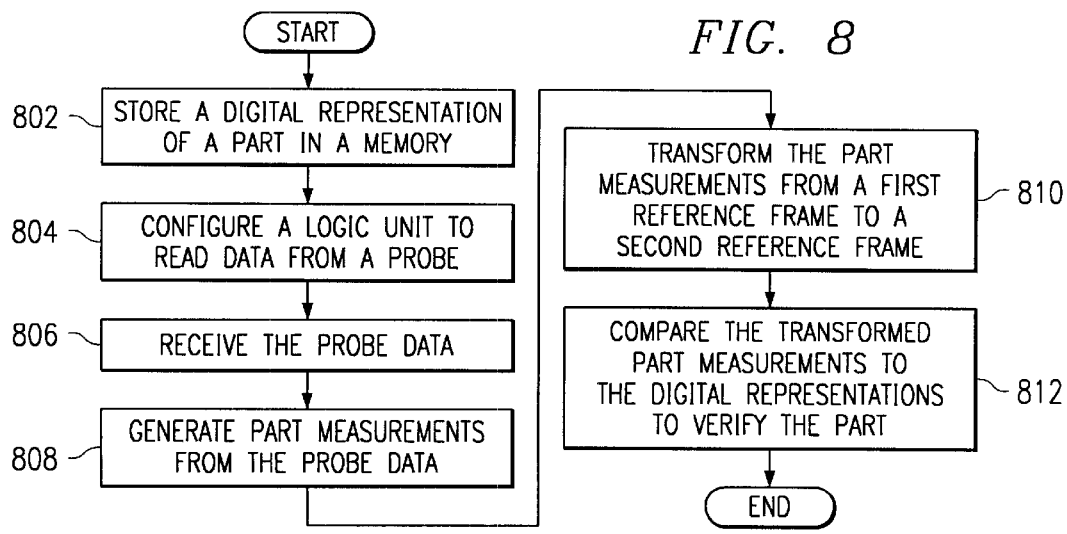
FIG. 8 is a flowchart demonstrating one method of measurement analysis in accordance with the present invention.

FIG. 8 is a flow chart demonstrating one method of measurement analysis in accordance with the present invention. The method begins with step 802, where a digital representation of a part 102 is stored in a memory 124. The digital representation may be, for example, the design specifications of the part. The memory may be, for example, part of an information processor 118. In step 804, a logic unit is configured to read data from a probe 108. The logic unit may be, for example, the microprocessor of an information processor 118. The probe 108 may be, for example, any of the probes described in connection with FIGS. 4, 5A, and 5B. In step 806, the logic unit receives the probe data. The probe data may be analog signals representative of measurements of the part 102 to be verified. The method then proceeds to step 808, where the part measurements are generated from the probe data. In step 810, the part measurements are transformed to align the actual datum positions with the nominal part datums, that is, to align an actual coordinate system with the nominal part. The measurements may be transformed again in order to place them in the reference frame in which the digital representation of the part is expressed, because often the design criteria will be given in a reference frame different from that in which the measurements are expressed. Finally, in step 812, the part measurements are compared to the digital representation to verify the part.

FIG. 9 is a flowchart demonstrating one method of measurement analysis and verification in accordance with the present invention. An embodiment of this method may be written in Visual Basic 5.0 designed for Microsoft™ Windows. An embodiment may provide a graphical interface that provides the user with a display with which the user may interact (for example, receive or input information) with the system during a step in the method. The method begins with step 901, where the user selects to create a new measurement job, open an existing measurement job, send a measurement job, print a measurement job, or exit the program. If the user selects to create a new job (step 902), then the method proceeds to step 904, where the user selects an IDS file. An IDS file, which may be, for example, a protected Microsoft™ Excel file, is specific to a particular fixture 104 and a particular part 102. An IDS file may contain: (1) the three-dimensional position and direction of each gage block 106 with respect to, for example, the fixture reference system (the XYZ coordinate system); (2) part datum criteria, which are the nominal positions of the part datum in the part reference system (the X'Y'Z' coordinate system); (3) part feature criteria, which are the desired positions of the part features expressed in the aircraft reference system (the X"Y"Z" coordinate system); (4) transformation equations from the X'Y'Z' coordinate system to the X"Y"Z" coordinate system; and (5) the analysis case for each feature position, which describes how each feature is to be analyzed, based on the type of the feature (e.g., hole, surface). After the user selects the IDS file, the process proceeds to step 905. If the user selects to open an existing measurement job (step 908), the method proceeds to step 910, where the user is presented with a list of existing jobs. Once the user opens an existing job, the method proceeds to step 905. If the user selects to send a measurement job, print a measurement job, or exit the program (step 912), the method proceeds to step 913, where the user may complete the selected action.

In step 905, probe configuration data is stored in the information processor 118. The information processor 118 uses this data to determine how to collect the part measurements. The data includes probe serial numbers, which are used by the information processor 118 to determine the unique calibration factors of each probe 108, and computer data channel numbers, which are used to identify the data channels to which the probes 108 are coupled.

The method then proceeds to step 906, where the user selects the probe types to measure the part. Examples of probe types are presented in the discussion in connection with FIGS. 4, 5A and 5B. The method then proceeds to step 914, where the information processor assigns a computer input channel to each probe 108. Each probe 108 must be coupled to its assigned computer input channel. Probes may be allowed to share computer data channel numbers, but only one of the sharing partners can be coupled to its computer input channel at any given time. In step 916, the user records the probe zero values to establish the zero or reference point of the probe output. In step 918, the user performs field checks on the probes in order to validate the accuracy of the probes at the high and low end points of the measurement range.

The method then proceeds to step 920, where the position and direction of each gage block 106 is determined. These positions may be stored in the IDS file. The position ($x_g$, $y_g$, $z_g$) and the direction (i, j, k,) of each gage block 106 are expressed in the XYZ coordinate system. In step 922, a probe measures the scalar distance from the probe tip to its associated part datum, and the information processor 118 receives the measurement. From that measurement and the nominal setback of the probe, the distance $S_d$ from the gage block 106, located at ($x_g$, $y_g$, $z_g$), to its associated part datum can be computed. In step 924, the user measures the overconstraint point (the OCP), which is used to validate whether the part can be inspected as supported in the fixture, that is, the part is not racked, warped, or twisted. The information processor 118 receives this measurement. The user checks to see that the OCP position is within the tolerance guidelines. In step 926, a probe measures the scalar distance from the probe tip to its associated part feature, and the information processor 118 receives the measurement. From that measurement and the nominal setback of the probe, the distance $s_f$ from the gage block 106, located at ($x_g$, $y_g$, $z_g$), to its associated part feature can be computed.

The method then proceeds to step 928, where the part datum and part feature positions are calculated in the XYZ coordinate system. Given the gage block position ($x_g$, $y_g$, $z_g$) and direction (i, j, k) and the distance $S_d$ between the gage block and the part datum, the part datum position ($x_d$, $y_d$, $z_d$), can be calculated using a distance formula. The part feature positions can be calculated in a similar manner.

The method then proceeds to step 930, where the transformation equations from the fixture reference frame (the XYZ coordinate system) to the part reference frame (the X'Y'Z' coordinate system) are calculated. The transformation equations are calculated by comparing the measured positions of the part datums with their corresponding nominal positions. In step 932, the transformations equations are applied. The transformation serves to align the actual part datums with their corresponding nominal positions. For example, suppose that a datum hole is supposed to be located at (0, 0, 0). If the hole does not have the coordinate (0, 0, 0) in the XYZ coordinate system, the transformation will transform its coordinates to (0, 0, 0) in the X'Y'Z' coordinate system. In step 934, the coordinates are transformed from the X'Y'Z' coordinate system to the X"Y"Z"

coordinate system. The transformation equations for this transformation may be contained in the IDS file. This transformation serves to express the coordinates of the part positions in the aircraft reference frame, the frame in which the design criteria are expressed.

The method then proceeds to step 938, where the measured part feature positions are compared with the design criteria in order to verify the part. The information processor 118 checks whether the positions of the part features fall within the tolerance ranges specified by the design criteria. Finally, after the features are checked, the method proceeds to step 940, where a part verification report is generated. The part verification report may be, for example, a Microsoft Word document that contains the measured and calculated part feature data and whether the part feature satisfies the design criteria.

Although an embodiment of the invention and its advantages are described in detail, a person skilled in the art could make various alternations, additions, and omissions without departing from the spirit and scope of the present invention as defined by the appended claims.

What is claimed is:

1. A system for part measurement and verification, the system comprising:
    a) A set of design criteria specifying the part;
    b) A fixture, having gage blocks, for positioning the part, each of the gage blocks representing a known position;
    c) At least one probe operable to measure scalar values of the part and gage blocks; and
    d) A hand held information processor in communication with the probe for receiving the scalar measurements and operable to:
        transform the measurements from a first reference frame associated with a first coordinate system to a second reference frame associated with a second coordinate system by transforming the measurements from the first coordinate system to the second coordinate system; and
        compare those measurements to the design criteria to verify the part.

2. The system of claim 1 further comprising a belt for coupling the probe to the information processor.

3. The system of claim 1 further comprising a plurality of probes and a belt operable to couple the probes to the information processor, the plurality of probes comprising the at least one probe.

4. The system of claim 1 wherein the scalar values are two dimensional.

5. The system of claim 1 wherein the part has a plurality of datums and there is at least one gage block associated with each datum.

6. A method for part measurement and verification, the method comprising:
    a) Specifying the part with a set of design criteria;
    b) Storing the design criteria in a hand held information processor;
    c) Placing the part in a fixture having gage blocks where the gage blocks are at known locations;
    d) Configuring the hand held information processor to receive part measurements;
    e) Measuring the part with a hand held probe to generate part measurements;
    f) Receiving the generated part measurements in the hand held information processor;
    g) Transforming the generated part measurements to a different reference frame by transforming the generated part measurements to a different coordinate system; and
    h) Comparing the transformed part measurements to the design criteria to generate a part verification report.

7. The method of claim 6 wherein the design criteria comprise a digital representation of the part.

8. The method of claim 6 wherein the part has one or more datums.

9. The method of claim 6 wherein the part has one or more datums and each datum is associated with at least one of the gage blocks.

10. The method of claim 6 further comprising displaying the part measurements on the information processor.

11. The method of claim 6 further comprising displaying the part verification report on the information processor.

12. A method for measuring and verifying a part, the method comprising:
    a) Specifying the part with a set of design criteria in a first reference frame associated with a first coordinate system;
    b) Storing the design criteria in an information processor;
    c) Placing the part in a fixture having gage blocks where the gage blocks are at known locations;
    d) Configuring the information processor to receive part measurements in a second reference frame associated with a second coordinate system;
    e) Measuring the part with a probe to generate part measurements;
    f) Receiving the generated part measurements in the information processor;
    g) Transforming the generated part measurements from the second reference frame to the first reference frame by transforming the generated part measurements from the second coordinate system to the first coordinate system; and
    h) Comparing the transformed part measurements to the design criteria to generate a part verification report.

13. The method of claim 12 wherein the design criteria are a digital representation of the part.

14. The method of claim 12 wherein the information processor is a single hand held information processor.

15. The method of claim 12 wherein the measuring step further comprises measuring the gage blocks.

16. The method of claim 12 wherein the part has one or more datums.

17. The method of claim 12 further comprising calibrating the probe.

18. The method of claim 12 further comprising displaying the verification report.

19. A method for measuring and verifying a part, the method comprising:
    a) Storing a digital representation of a part in a memory;
    b) Configuring a logic unit to read data from a probe representative of part measurements;
    c) Receiving the probe data;
    d) Generating part measurements from the probe data;
    e) Transforming the part measurements from a first reference frame associated with a first coordinate system to a second reference frame associated with a second coordinate system by transforming the part measurements from the first coordinate system to the second coordinate system; and
    f) Comparing the transformed part measurements to the digital representation to verify the part.

20. The method of claim 19 wherein all the steps are performed on a single information processor.

21. The method of claim 19 wherein all the steps are performed on a single hand held information processor.

22. The method of claim 19 further comprising displaying the part measurements after they are generated.

23. The method of claim 19 further comprising providing prompts to a user.

24. The method of claim 19 further comprising configuring the logic unit to read from a plurality of probes.

25. The method of claim 19 further comprising displaying the results of the comparing step.

* * * * *